D. Eynon,
Making Railroad Chairs,
Nº 30,673. Patented Nov. 20, 1860.
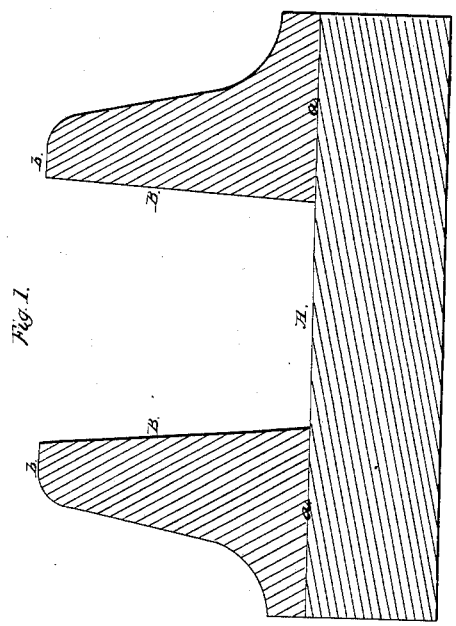
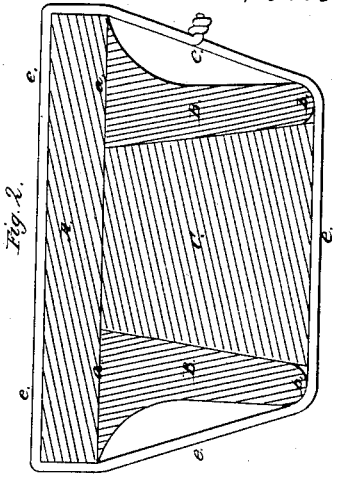
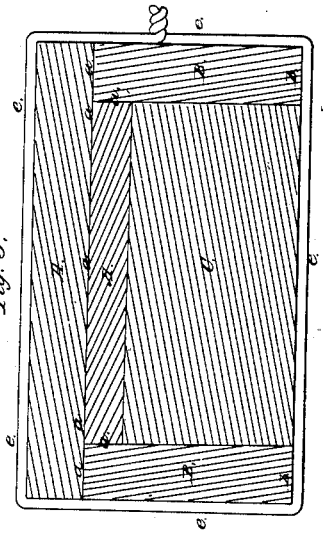
Witnesses.
Inventor.
David Eynon
by atty A.B. Stoughton

UNITED STATES PATENT OFFICE.

DAVID EYNON, OF PHILADELPHIA, PENNSYLVANIA, ASSIGNOR TO CHARLES E. SMITH, OF SAME PLACE.

MAKING RAILROAD-CHAIRS.

Specification of Letters Patent No. 30,673, dated November 20, 1860.

*To all whom it may concern:*

Be it known that I, DAVID EYNON, of the city and county of Philadelphia and State of Pennsylvania, have invented certain new and useful Improvements in the Method of Forming a Pile and Heating the Same for the Purpose of Making Wrought-Iron Railroad-Chairs; and I do hereby declare that the following is a full, clear, and exact description of the same reference being had to the accompanying drawings, making a part of this specification, in which—

Figure 1, represents an end view of a pile as heretofore made of three pieces. Fig. 2, represents my plan of making the pile. Fig. 3, represents another form of pile made after my plan, but of four pieces.

Similar letters of reference where they occur in the drawings denote like parts in the figures.

The object of my invention is not only to make the pile as near the form of the finished bar as possible to save so many passes in rolling, but also to so put it together as that it may be advantageously and economically charged and heated in the furnace. I am aware that a pile composed of horizontal and vertical bars has been made and used, but there has been so much loss of heat as well as loss of metal in the manner in which it has been heated and welded in the furnace as to make it expensive and otherwise objectionable.

My invention consists in combination with the horizontal and vertical bars that compose the finished bar, a plug, core, brace or braces of wood or other perishable material, the whole secured together by a wire or other tie, so that the pile may be placed in the furnace where it is to be welded in an inverted position, and so that the plug, core, brace or braces, and the tie, may be consumed before the hot pile is removed to be rolled into its finished form.

To enable others skilled in the art to make and use my invention, I will proceed to describe the same with reference to the drawings.

Fig. 1, represents a pile which has been heretofore made composed of three bars, viz: a horizontal one A—and two vertical bars B. B. This pile has been placed in the furnace with the bar A resting upon the furnace bottom, and those B, resting on top of it. The joints to be welded together, are at $a, a$. It will be seen that there is more metal where the weld $a, a$ is to be made, than in other parts of the pile—as for instance in the parts $b$ of the vertical bars, and that a heat that will cause the greater mass to weld, will burn away and waste the metal at the thinner portions, so much so that additional metal has to be placed at these thinner points to supply this waste. The denser heat too is not at the bottom of the furnace, but above it. This is due first to the fire bridge which directs the flame upward from, and to the ashes and cinder that accumulates on, the bottom of the furnace, so that to get a welding heat at $a, a$, which is in the cooler part of the furnace, a destructive heat is had at $b$ where there is no welding to be done, and thus there is a loss in time, heat and metal. The vertical bar too, which is next to the bridge keeps the heat from the base of the bar which is more remote and prevents its reaching a welding heat while the rest of the pile is even too hot. For this reason it is only imperfectly welded at best and very often not welded at all.

I make the pile as shown in Fig. 1, but place between the bars A, B, B, as shown in Fig. 2, a block, plug, core, brace or braces of wood C, or other perishable material, and unite the whole by a tie, or ties of wire $c$ that will firmly hold the whole together. The pile thus made is then inverted as shown in Fig. 3, and in this inverted position placed in the furnace. This it will be seen brings the greater mass of metal and the parts $a$ $a$ to be welded in contact with the denser heat of the furnace, and the thinner portions $b$ $b$ which are liable to burn and waste in the less dense heat. The perishable material C that held the pile together while being handled and charged in the furnace is consumed by the heat—and the wire tie or fastening $c$, is burned off, but the pile retains its form and the heating is effected without disturbing their positions. When the pieces are brought to a welding heat the pile is taken out, rolled and the chairs cut off in the usual well known ways.

Fig. 3 represents a modified form of pile, which however is held together, placed in the furnace and welded in the same way. And of course other forms of bars may be similarly united, placed and welded. The fastening too instead of being of wire as shown may be made in any other way that will accomplish the object viz: holding the pile together while being handled and heated, and consumed, or otherwise disposed of, so as not to require removal, when the hot pile is taken out to be rolled as such removal would require delay and loss of heat.

The core or brace will probably always be of wood, as being the cheapest, and most readily consumed, but I do not limit my invention to the use of wood, as other material may be used. But any material that has to be removed from the pile after it is withdrawn from the furnace will be found objectionable, because the loss of time, in such removal is also a loss of heat. Wooden clamps could not be used for holding the pile together without some central support to keep the side pieces apart—the pile must be supported both ways, to keep the pieces in proper position but wooden clamps to hold the pile in one direction, with a central support to brace them apart or in an opposite direction might be used. By my mode of making and welding the pile, I save several passes through the rolls.

Having thus fully described my method of making heating and welding a pile, for making railroad chairs what I claim is—

In combination with the horizontal and vertical bars that are to compose the pile, the central plug, core, or brace of wood, and the external tie of wire, so that the pile may be inverted and charged and heated, in this inverted position in the furnace substantially as described.

DAVID EYNON.

Witnesses:
ROBERT HUTCHINSON,
JOSEPH JACOBS.